Jan. 12, 1960  E. J. GIEBEL  2,920,855
BRACKET FOR BAIT CAN
Filed Oct. 31, 1957

INVENTOR.
ELMER J. GIEBEL,
BY
*Parker and Carter*
ATTORNEYS.

United States Patent Office 2,920,855
Patented Jan. 12, 1960

2,920,855

BRACKET FOR BAIT CAN

Elmer J. Giebel, Chicago, Ill.

Application October 31, 1957, Serial No. 693,763

5 Claims. (Cl. 248—226)

My invention relates to a new and novel means for suspending a bait receptacle such as a bait can, chum box or minnow bucket from any relatively stationary or rigid base, such as the side of a typical rowboat.

Accordingly, an object of my invention is the provision of a bait container suspending device which firmly and securely suspends a bait container and yet is light, portable, and easily adjustable.

Another object is to provide a bait container suspension bracket that may be so manipulated that the container will be quickly and easily adjusted in a direction perpendicular to the side of the boat.

Another object is the provision of a bait container suspension bracket that permits the container to be easily adjusted in a vertical direction.

Another object is the provision of a bait container suspension bracket whereby the preceding two adjustments may be made quickly, easily and either simultaneously or independently.

A further object of my invention is the provision of a bait container holding device which is comprised of a minimum of parts, is low in manufacturing cost and is easy to assemble.

Another object of my invention is the provision of a bait container holding bracket that will maintain a minnow bucket, chum box or the like far enough from the boat to prevent the container from banging against the side of the boat, thus chipping and gouging the paint and frightening the fish.

Other objects will become apparent throughout the course of the specification.

Figure 1:
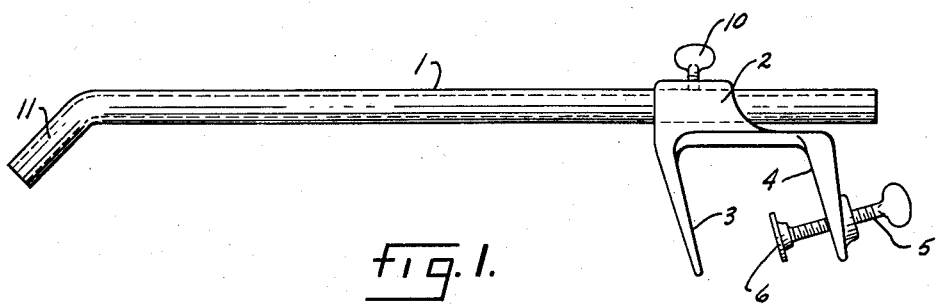
Figure 2:
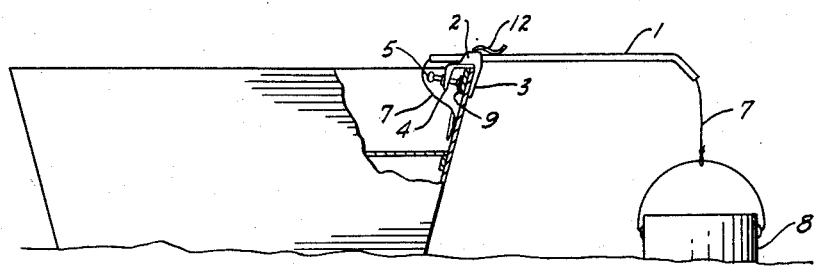

I illustrate my invention more or less diagrammatically in the accompanying drawings wherein, Figure 1 is a side view of the preferred embodiment of my invention; and Figure 2 is a view, diagrammatic in form, illustrating the device in position on the side of a boat and showing another horizontal adjustment means.

Like parts are indicated by like reference numerals through the specification.

In Figure 1 I have shown a bracket and bait can holding assembly adapted for attachment to the side of a boat consisting essentially of an elongated hollow tube 1 slidably received in an attachment bracket 2. The attachment bracket 2 is composed of a lower portion having a pair of depending legs 3 and 4 positioned to form an inverted U, and an upper portion having a bore in which the tube 1 is slidably received. A securing and clamping screw 5 having a separate, jointed end attachment 6 is threaded through the leg 4. In the embodiment of Figure 1, I have shown the attachment 6 as a wobble joint having a flat surface on the end of the adjusting screw 5, but it will be understood that any suitable clamping means such as a spring or set screw with or without a wobble joint is feasible. I prefer to utilize a large flat surface in order that the force exerted by the set screw will be distributed over a larger area than just the area of the screw, in order to prevent gouging and damage to the inside of the boat. The legs 3 and 4 are shown as inclined slightly with respect to the vertical. While this inclination may vary somewhat, in general it will be approximately the same angle at which the sides of the typical rowboat are cambered or inclined with respect to the vertical so that the bore in the upper portion of the bracket will remain approximately horizontal. By the provision of the wobble joint, I am able to compensate for slight changes in camber from boat to boat.

On some of the newer models of boats, especially boats molded from fiber glass, the upper edge of the side has a flange or outwardly protruding lip. On these boats the outer leg 3 as shown in the figures, will not lie next to the side of the boat and the bore in the upper portion of the bracket will be canted with respect to the horizontal. For attachment on these boats I find it convenient to form an inwardly extending projection on the leg 3 terminating in a flat surface or even another wobble joint in order to distribute the tightening force over a larger area than just the end of the inward projection.

In the embodiment described in Figure 1, the tube is loosely received in the bore and set screw 10 secures the tube 1 with respect to the bracket in any suitable predetermined position. The outboard end of the tube is shown as having a downwardly curved portion 11 for a purpose which will be described hereinafter.

Referring now to Figure 2, I have diagrammatically illustrated my bait can holding device in position on the side of a rowboat. By engagement of the surface 6 on the end of the set screw 5 with the inboard side of the boat 12 and the leg 3 with the outboard side, it will be seen that the tube 1 is held in a position approximately parallel to the surface of the water. A line 7 extends through the tube and a bait can 8 is attached to the outboard end of the line, the can being shown partially submerged in the lake or stream. The inboard end of the line 7 may be secured around a seat, stanchion or cleat in the boat or just left free.

If the line is left free and there is not enough friction between the line and the tube to prevent the line from paying out under the weight of the suspended bait container, it is only necessary to tie a simple knot in the line which will impinge upon the inboard end of the tube and prevent further movement. I also find it convenient to tie a plain ring or an S-hook into the line which will serve the same purpose as a knot as far as stopping the line from paying out, and which may be hooked over any projecting cleat, nail or the like.

I have shown a set screw 10 for positioning the tube with respect to the bracket, but it will be understood that any suitable positioning means may be used. Thus, for example, I may form the bore in the bracket 2 of such a diameter that the tube 1 is closely gripped with a friction fit. By suitably dimensioning the tube with respect to the inside diameter of the bore, the tube may be made slidably adjustable within the bore by simply grasping the inboard end of the tube and sliding it in the desired direction with a slight push or pull.

Yet another expedient that I consider entirely within the scope of my invention is the provision of a spring clamp located on the bracket. Thus, referring to Figure 2, a piece of spring steel 12 or any suitable material is shown welded or otherwise suitably secured to the upper portion of the bracket 2 and impinging upon the outboard end of the tube 1. The spring may be disposed in either an outboard or inboard direction.

Similarly, I contemplate that it is feasible to magnetize the bracket 2 so that it will attract the tube with sufficient force to hold it in position against displacement when the boat rocks, but with not sufficient strength to resist displacement exerted by hand. The tube and bracket must of course be a magnetizable material.

The use and operation of my device is as follows:

My device is especially useful to the fisherman who travels from place to place and utilizes a series of rowboats during the course of a fishing season. It is extremely portable, compact and easy to pack and may be fitted into the lower section of a tackle box. If, for example, a fisherman rents a boat from a boat livery he may attach may device to the side of the boat, detach it at the end of the day's fishing, and quickly put it on a different boat the next day.

In attaching the bracket to the side or end of the boat, the U-shaped legs 3 and 4 are placed over the side or end with the angle of inclination of the legs so disposed that the bore of the bracket will be level, that is, leg 3 will be outboard and leg 4 will be inboard of the boat side. The screw 5 is then tightened and the wobble joint 6 will impinge upon the inside surface of the boat creating a tight fit over a relatively wide area so that damage to the sides of the boat will be avoided. It will be understood that the inside engaging surface of the leg 3 may be flattened to spread the clamping force over a considerable area so that no damage will be done to even varnish finishes on the outside of the boat. If the angle of inclination of the bore varies due to the varying camber of the side of a boat, or from boat to boat, it is only necessary to put a chock or wedge between the wobble joint 6 and the side. The tube 1 with the line 7 threaded through it is inserted in the bore in the bracket 2, and the bait can 8 tied to the outboard end of the line. The tube is then run out a sufficient distance, the set screw 10 tightened, and the line 7 payed out to such a length that the usual rocking motions of the waves will not swing the bait can or minnow bucket far enough towards the boat to bang against the sides and gouge them. The inboard end of the line may be fastened around a seat or stanchion, cleat or any suitable projection. If he leaves it free, then a knot, plain ring or S-hook will prevent it from paying out. When the fisherman desires to rebait his hook, he merely unfastens the set screw 10, grasps the inboard end of the tube and pulls the minnow bucket to the side of the boat. It will be understood that the set screw could remain tightened and only the line pulled in and temporarily secured by means of the knot, ring or S-hook. This of course presupposes that the container is within convenient reaching distance. If the can has been submerged, it is necessary to haul in the line an amount sufficient to bring the top of the can above the waves. After taking a minnow from the bucket, the rod is pushed out, screw 10 tightened, and the line 8 payed out again. If a spring clamp, friction fit, or magnetized bracket is used, the extra operation of loosening and tightening the set screw 10 will be dispensed with for it only requires a moderate amount of pull to overcome these frictional resistances.

My device is especially useful in trolling. The bracket may be clamped on the rear of the boat and run out a length sufficient to clear the bait can from the outboard motor. If the line 7 is pulled in to a point where the minnow bucket or bait can is only partially submerged in the water, there wil not be sufficient slack for the can to bob back into the motor or oars, or foul the trolling lines.

While my invention is entirely workable with a straight tube, I have shown a tube that is curved at the outboard end. This accomplishes three things. First, in paying out and hauling in the line, there will be less wear on the line from the cutting action of the internal bore in the end of the tube. Secondly, there is less chance that the line will become fouled and bind at the outboard end of the tube. Thus, if a line is used that is almost as large as the inside diameter of the tube, and especially if it becomes wet and swollen, it will not pass over a sharp corner as easily as an inclined surface.

Thirdly, and most important of all, it is often times not necessary to secure the inboard end of the line when the outboard end of the tube is curved because there is enough frictional contact between the tube and line to prevent the weight of the can or bucket from taking the line out. Since the water partially suspends the minnow bucket there is really very little pull being exerted on the line and if there is enough frictional force between the tube and the line, it may not be necessary, especially when fishing in calm waters, to unsecure and resecure the inboard end of the line each time a bait is taken from the can.

Thus, it will be seen that I have provided a bait holding assembly which permits a suspended bait can or minnow bucket to be rigidly held with respect to the side of a boat and yet easily adjusted in a horizontal direction. Similarly, the depth of immersion of bait can or minnow bucket may be easily varied and it is possible to make these two adjustments at the same time merely by using one hand to pull the line and the other to pull the tube. These adjustable features I consider especially important since they permit the bait can to be carried at a safe distance regardless of the roughness of the water or the amount of roll of the boat.

While I have shown and described a preferred embodiment of my invention and three variations thereof, it will be understood that many variations may be employed in size, shape and disposition of parts, and accordingly I wish to be limited only by the scope of the following appended claims.

I claim:

1. In combination, a bracket having a pair of depending legs forming a generally U-shaped lower portion and an upper portion having a bore therein extending in a direction generally transverse to the longitudinal axes of the legs, releasable tightening means disposed in one of the legs for engagement with the side or end of a boat, an elongated tube curved at the outboard end slidably received in the bore, selectively releasable adjusting means on the bracket for fastening the tube in a predetermined position with respect to the bracket, a bait receptacle, and a line attached to the bait receptacle and extending through the tube and projecting from the inboard end thereof whereby the bait receptacle may be adjustably positioned with respect to the boat by manipulation of the inboard end of the line and the tube.

2. An adjustable suspending device for a bait receptacle such as a bait can, minnow bucket or the like including an attachment bracket adapted to be mounted on a relatively rigid base such as the side of a boat, a hollow tube carried by the bracket and adjustably mounted for movement in a longitudinal direction only with respect to the bracket and base, said tube being adapted to have a line extending therethrough and projecting from both ends, the outboard end being adapted for connection with a bait receptacle or the like, and clamping means for selectively positioning the tube with respect to the bracket, said clamping means being a spring clamp mounted on the bracket engageable with the tube and adapted to exert a frictional force between the tube and bracket.

3. An adjustable suspending device for a bait receptacle such as a bait can, minnow bucket or the like including an attachment bracket adapted to be mounted on a relatively rigid base such as the side of a boat, a hollow tube carried by the bracket and adjustably mounted for movement in a longitudinal direction only with respect to the bracket and base, said tube being adapted to have a line extending therethrough and projecting from both ends, the outboard end being adapted for connection with a bait receptacle or the like, and clamping means adapted to selectively position the tube with respect to the bracket, said clamping means being a friction fit between the tube and bore of the bracket.

4. A device for suspending a minnow bucket or the like from a boat, including a bracket having a generally U-shaped portion adapted to fit over the side or end of a boat, said bracket having a bore therein, a securing and clamping means carried by one leg of the U-shaped portion of the bracket for releasably and rigidly fastening the bracket to the boat, an elongated hollow tube slidably received within the bore in the bracket, such tube having at least one curved portion near the outboard end thereof, adjusting means for selectively positioning the tube in a predetermined position with respect to the bracket, and a line extending through and projecting from the inboard and outboard ends of the tube, one end of the line being adapted for attachment to a minnow bucket or the like.

5. An adjustable bracket assembly for suspending a bait can from the side of a boat including, in combination, a generally U-shaped bracket adapted to slip over the side of a boat, said bracket having a pair of depending legs with opposed substantially parallel clamping faces, said bracket having a bore in the upper portion thereof, the clamping faces being so positioned with respect to the axis of the bore that the bore is substantially horizontal when the legs straddle the boat side, releasable tightening means in one of the legs for securing the bracket to the boat, an elongated hollow tube slidable along the bore in the bracket, the outboard end of the tube being directed downwardly a distance sufficient to permit easy displacement of a line in the tube without binding the line, and selectively releasable adjusting means for locating the tube in a predetermined position with respect to the bracket.

References Cited in the file of this patent

UNITED STATES PATENTS

| | | |
|---|---|---|
| 2,070,495 | Strutz | Feb. 9, 1937 |
| 2,231,137 | Ohm | Feb. 11, 1941 |
| 2,272,569 | Luhmann | Feb. 10, 1942 |
| 2,384,101 | Kruse | Sept. 4, 1945 |
| 2,485,684 | Aldredge | Oct. 25, 1949 |
| 2,491,860 | Ingraham | Dec. 20, 1949 |
| 2,631,807 | Witt | Mar. 17, 1953 |
| 2,637,128 | Weeks | May 5, 1953 |

FOREIGN PATENTS

| | | |
|---|---|---|
| 76,017 | Norway | Dec. 12, 1949 |